(12) United States Patent
Simofi-Ilyes et al.

(10) Patent No.: US 12,703,223 B2
(45) Date of Patent: Aug. 11, 2026

(54) HEAT EXCHANGER SYSTEM

(71) Applicant: Brose Fahrzeugteile SE & Co. Kommanditgesellschaft, Würzburg, Würzburg (DE)

(72) Inventors: Attila Simofi-Ilyes, Clarkston, MI (US); Tao Hong, Farmington Hills, MI (US); John Fleck, Clarkston, MI (US); Arnd Herwig, Oakland Township, MI (US)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 190 days.

(21) Appl. No.: 18/388,727

(22) Filed: Nov. 10, 2023

(65) Prior Publication Data

US 2025/0153535 A1 May 15, 2025

(51) Int. Cl.

*B60H 1/00* (2006.01)
*F01P 5/02* (2006.01)
*F01P 7/04* (2006.01)

(52) U.S. Cl.

CPC ..... *B60H 1/00507* (2013.01); *B60H 1/00021* (2013.01); *B60H 1/00757* (2013.01);
(Continued)

(58) Field of Classification Search

CPC ............ B60H 1/00507; B60H 1/00021; B60H 1/00757; B60H 1/00321; B60H 1/0073;
(Continued)

(56) References Cited

U.S. PATENT DOCUMENTS 4,036,432 A * 7/1977 George .................. F01P 7/044 236/35
4,378,760 A * 4/1983 Barge ...................... F01P 7/048 318/471

(Continued)

FOREIGN PATENT DOCUMENTS

DE 4033092 4/1992
EP 323212 A * 7/1989

(Continued)

OTHER PUBLICATIONS

Extended European search report for EP 24210671.4, Dated May 21, 2025, 9 Pages.

*Primary Examiner* — Ljiljana V. Ciric
(74) *Attorney, Agent, or Firm* — Dickinson Wright PLLC

(57) ABSTRACT

A heat exchanger system including a controller configured to direct a first power signal to a first cooling fan module to operate a first motor at a first rotational speed to provide a first flow rate to satisfy the first demanded heat rejection rate, direct a second power signal to the second cooling fan module to operate the second motor at a second rotational speed to provide a second flow rate to satisfy the second demanded heat rejection rate while maintaining a rotational speed differential between the first rotational speed and the second rotational speed, such that an acoustic property of at least one of the first heat exchanger assembly and the second heat exchanger assembly is below a predetermined acoustic property threshold.

20 Claims, 8 Drawing Sheets

(52) U.S. Cl.
CPC ................. *F01P 7/04* (2013.01); *F01P 7/048* (2013.01); *B60H 1/00321* (2013.01); *B60H 2001/006* (2013.01); *B60H 1/0073* (2019.05); *F01P 2005/025* (2013.01)

(58) Field of Classification Search
CPC ....... B60H 2001/006; F01P 7/04; F01P 7/048; F01P 2005/025
See application file for complete search history.

(56) References Cited

U.S. PATENT DOCUMENTS 4,651,922 A * 3/1987 Noba .................... F04D 25/166 236/35
6,662,761 B1 * 12/2003 Melchior ................ F01P 7/048 123/41.44
6,748,162 B2 * 6/2004 Poutot ................... F04D 25/166 318/272
6,933,687 B2 * 8/2005 Makaran ............... F04D 25/166 318/78
7,158,644 B2 * 1/2007 Kakuhari ......... G10K 11/17825 381/71.5
7,282,873 B2 * 10/2007 Abali .................... F04D 29/665 417/42
7,347,167 B2 * 3/2008 Sugiyama ............... F01P 7/048 123/41.11
7,370,695 B2 * 5/2008 Haglsperger ....... B60H 1/00507 165/41
7,580,617 B2 * 8/2009 Yabe ......................... H02P 7/29 318/400.14
7,859,213 B2 * 12/2010 Serizawa ............ H02P 29/0241 318/471
7,941,231 B1 * 5/2011 Dunn ...................... G06F 1/203 73/514.01
8,368,329 B1 * 2/2013 Depew ...................... H02P 1/04 318/272
8,606,428 B2 * 12/2013 Chan .................. H05K 7/20727 361/679.48
8,855,329 B2 * 10/2014 Slapak ............. G10K 11/17861 379/406.01
8,985,068 B2 * 3/2015 Nicgorski ............... F01P 7/048 416/37
9,428,035 B2 * 8/2016 Eisenhour .......... B60H 1/00828
9,907,205 B1 * 2/2018 Chen .................. H05K 7/20136
10,061,332 B2 * 8/2018 North ...................... G06F 1/206
10,716,502 B2 * 7/2020 Kusukame ......... A61B 5/14551
10,717,340 B2 * 7/2020 Jones ................. B60H 1/00828
10,870,330 B2 * 12/2020 Niemann ............... G08B 21/22
10,941,704 B2 * 3/2021 Salter ......................... F01P 3/20
11,045,127 B2 * 6/2021 Kusukame ......... A61B 5/02444
11,347,298 B2 * 5/2022 Wang .................. G05B 19/045
11,614,021 B1 * 3/2023 Kim ......................... F01P 11/14 123/155
11,794,568 B2 * 10/2023 Feltham ................. B60K 11/04
11,820,302 B2 * 11/2023 Srivastava ............ B60R 16/037
11,865,897 B2 * 1/2024 Jones ................. B60H 1/00828
11,914,436 B2 * 2/2024 Chang ................... G06F 1/1632
12,403,748 B2 * 9/2025 Srichai ................. B60H 1/3232
2004/0206099 A1 * 10/2004 Kim ........................ F01P 7/048 62/178
2006/0120903 A1 * 6/2006 Iwasaki ................... F01P 7/048 417/423.1
2006/0191500 A1 8/2006 Sugiyama et al.
2008/0259563 A1 * 10/2008 Fukuda ................ G11B 33/142 361/695
2009/0002939 A1 * 1/2009 Baugh ..................... G06F 1/206 361/679.48
2010/0024555 A1 * 2/2010 Gross ................. G01N 29/4427 73/579
2010/0080399 A1 * 4/2010 Pfau ................... B60H 1/00828 381/71.4
2011/0010015 A1 * 1/2011 Jordan ............... B60H 1/00757 700/280
2012/0150469 A1 * 6/2012 Welter .................. F04D 29/661 702/77
2013/0015801 A1 * 1/2013 Ady ..................... G11B 33/144 318/460
2013/0037620 A1 * 2/2013 Aryanfar ................. G06F 1/206 454/256
2014/0094973 A1 * 4/2014 Giaimo, III ........... F04D 27/004 381/56
2020/0376927 A1 * 12/2020 Rajaie ................ B60H 1/00764
2021/0107334 A1 * 4/2021 Shtrom .............. B60H 1/00742
2025/0206101 A1 * 6/2025 Xu ..................... B60H 1/00828

FOREIGN PATENT DOCUMENTS

EP 1495886 A1 1/2005
KR 20220142591 A 10/2022

* cited by examiner 102
104
ECU 1
ECU 2
124
126
Cooling Fan Module 1
Cooling Fan Module 2
106
106
132, 133
132, 133
110
134
Heat Exchanger 1
Heat Exchanger 2
Sensor 1
Sensor 2
128
130
108
158
132, 133
132, 133
Vehicle Func. Component 1
Vehicle Func. Component 2
Vehicle Electronic Control Unit (ECU)
134
112
114
116
134

Cooling Fan Module ECU
136
134
102
104
Cooling Fan Module 1
Cooling Fan Module 2
106
106'
132, 133
110
Heat Exchanger 1
Heat Exchanger 2
108
162
Vehicle Func. Component 1
Vehicle Func. Component 2
Vehicle Electronic Control Unit (ECU)
112
114
115

HEAT EXCHANGER SYSTEM

TECHNICAL FIELD

The present disclosure relates to a system and method of controlling a heat exchanger system for a vehicle.

BACKGROUND

A known cooling fan module and method of operating the same for use in a vehicle is disclosed in U.S. Pat. No. 11,339,707.

SUMMARY

An aspect of the disclosed embodiments includes a heat exchanger system for use in a vehicle. The heat exchanger system may include a first heat exchanger, a second heat exchanger, a first cooling fan module, a second cooling fan module, and at least one controller. The first heat exchanger may be configured to cool a first functional component of the vehicle and the second heat exchanger may be configured to cool a second functional component of the vehicle. The first cooling fan module may be provided with a first fan and a first motor, the first motor may be configured to drive the first fan to cool the first heat exchanger, and the first cooling fan module and the first heat exchanger may collectively form a first heat exchanger assembly. The second cooling fan module may be provided with a second fan and a second motor, the second motor may be configured to drive the second fan to cool the second heat exchanger, and the second cooling fan module and the second heat exchanger may collectively form a second heat exchanger assembly. The at least one controller may be configured to, responsive to receiving a first demanded heat rejection rate associated with the first heat exchanger and a second demanded heat rejection rate associated with the second heat exchanger, command the first cooling fan module to provide a first flow rate, and based on the first flow rate, command the second cooling fan module to provide a second air flow rate that is offset from the first air flow rate such that one or more acoustic properties of at least one of the first heat exchanger assembly and the second heat exchanger assembly is below a predetermined acoustic property threshold.

Another aspect of the disclosed embodiments includes another heat exchanger system for use in a vehicle. The heat exchanger system may include a first heat exchanger, a second heat exchanger, a first cooling fan module, a second cooling fan module, and at least one controller. The first heat exchanger may be configured to cool a first functional component of the vehicle and the second heat exchanger may be configured to cool a second functional component of the vehicle. The first cooling fan module may be provided with a first fan and a first motor, the first motor may be configured to drive the first fan to cool the first heat exchanger, and the first cooling fan module and the first heat exchanger may collectively form a first heat exchanger assembly. The second cooling fan module may be provided with a second fan and a second motor, the second motor may be configured to drive the second fan to cool the second heat exchanger, and the second cooling fan module and the second heat exchanger may collectively form a second heat exchanger assembly. The at least one controller may be configured to, responsive to receiving a first demanded heat rejection rate associated with the first heat exchanger and a second demanded heat rejection rate associated with the second heat exchanger, direct a first power signal to the first cooling fan module to operate the first motor at a first rotational speed to provide a first flow rate to satisfy the first demanded heat rejection rate, and direct a second power signal to the second cooling fan module to operate the second motor at a second rotational speed to provide a second flow rate to satisfy the second demanded heat rejection rate while maintaining a rotational speed differential between the first rotational speed and the second rotational speed, such that an acoustic property of at least one of the first heat exchanger assembly and the second heat exchanger assembly is below a predetermined acoustic property threshold.

Another aspect of the disclosed embodiments includes a method of operating a heat exchanger system for use in a motor vehicle. The method may include: receiving, by a controller, a first demanded heat rejection rate associated with a first heat exchanger; receiving, by the controller, a second demanded heat rejection rate associated with a second heat exchanger; directing, by the controller, a first power signal to a first cooling fan module, disposed adjacent to the first heat exchanger, to operate a first motor of the first cooling fan module at a first rotational speed to provide a first flow rate to satisfy the first demanded heat rejection rate; directing, by the controller, a second power signal to a second cooling fan module disposed adjacent to the second heat exchanger to operate a second motor of the second cooling fan module at a second rotational speed to provide a second flow rate; and maintaining, by the controller, a rotational speed differential between the first rotational speed and the second rotational speed, such that an acoustic property of the heat exchanger system is below a predetermined acoustic property threshold.

DETAILED DESCRIPTION

Figure 1:
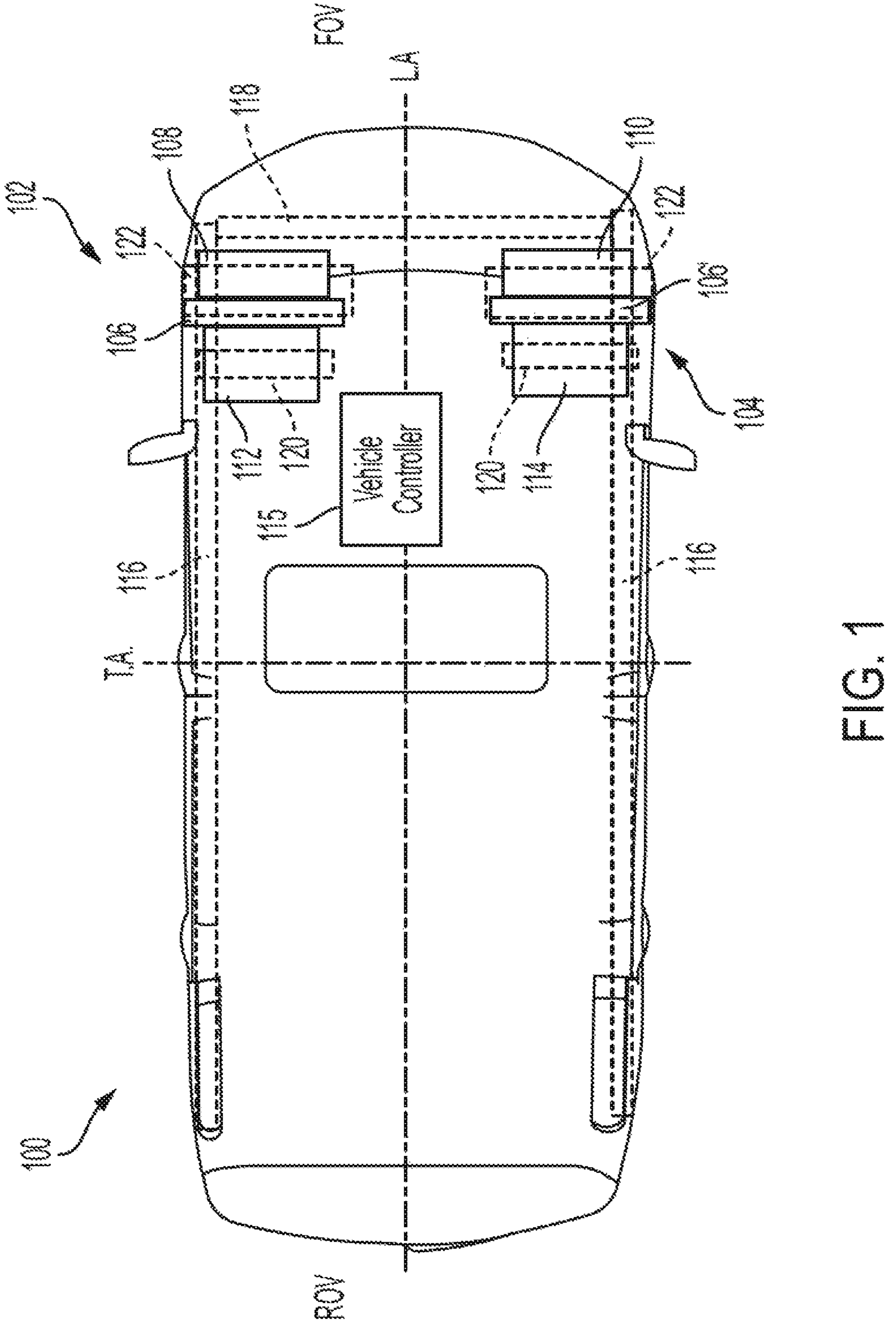
FIG. 1 illustrates a schematic top view of a vehicle according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "inboard," "outboard," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Certain vehicles, particularly, battery electric vehicles (BEVs) may require two or more heat exchangers (e.g., radiator, oil cooler, condenser, battery chiller) and one or more cooling devices (e.g., cooling fan modules) to cool each of the heat exchangers. Typically, one cooling fan module may be arranged with respect to the two heat exchangers so that one cooling fan module may cool the two heat exchangers. Such an arrangement is disclosed in U.S. Publication No. 2022/0388361 A1, which is hereby incorporated by reference. In other vehicles, one cooling fan module provided with two fan assemblies may be used to cool one or more heat exchangers.

However, some vehicles, due to the layout or position of the two or more heat exchangers, may require two cooling fan modules that are spaced apart from one another, so that one heat exchanger is cooled by one cooling fan module and the other heat exchanger is cooled by the other cooling fan module. Operation of two fan assemblies, whether arranged in a single shroud or arranged in two separate cooling fan modules with separate shrouds, may cause objectionable acoustic properties (e.g., noise vibration harshness (NVH) tones, vibrations, sones, or loudness), especially when the cooling fan modules are operating at relatively high speeds. However, under certain circumstances, including but not limited to the natural frequency of the cooling fan modules, the heat exchangers, and the surrounding supports configured to carry the cooling fan modules and/or heat exchangers, objectionable acoustic properties may also be prevalent at lower speeds. While it may be economical to use two identical cooling fan modules, which would allow for economies of scale and reduced tooling costs as compared to tooling and producing two different cooling fan modules, implementation of two identical cooling fan modules and operating the same at substantially the same speed may also contribute to objectionable acoustic performance.

The present disclosure aims to address one or more of the above-mentioned problems.

FIG. 1 illustrates an exemplary vehicle 100 provided with a heat exchanger system according to one or more embodiments. The heat exchanger system may include a first heat exchanger assembly 102 and a second heat exchanger assembly 104, the first heat exchanger assembly 102 may be configured to cool a first vehicle functional component 112 and the second heat exchanger assembly 104 may be configured to cool a second vehicle functional component 114. The first vehicle functional component 112 and the second vehicle functional component 114 may be a traction battery, electric drive motor, electrified wheel end, an inverter, climate compressor, internal combustion engine, or one or more vehicle components that require cooling.

The first heat exchanger assembly 102 and the second heat exchanger assembly 104 may include one or more heat exchangers, including but not limited to a condenser, an oil cooler, a radiator, a battery chiller, and heat pump. The first heat exchanger assembly 102 may also include a first cooling fan module 106 and the second heat exchanger assembly 104 may also include a second cooling fan module 106'. The first cooling fan module 106 may be substantially identical to the second cooling fan module 106', and as stated above, the use of cooling fan modules that are substantially identical to one another may be economically advantageous, in that common tools and assembly equipment may be utilized. As will be described in greater detail below, one or more controller or electronic control units, such as a vehicle controller 115 may be provided to control one or more of the first and second cooling fan modules 106, 106', the first and second heat exchangers 108, 110, and the first and second vehicle functional vehicle components 112, 114.

The vehicle 100 may include a number of frame components that may be configured to support or carry the first and second heat exchanger assemblies 102, 104. The frame components may include one or more side rails 116 that may extend parallel to a longitudinal axis L.A. of the vehicle 100 and one or more cross members 118 that may extend between the side rails 116 in a direction substantially parallel of the transverse axis TA. In one or more embodiments, the first heat exchanger assembly 102 may be disposed near the front of the vehicle FOV on one side of the longitudinal axis L.A. and the second heat exchanger assembly 104 may be disposed on the other side of the longitudinal axis. As another example, the first and second heat exchanger assemblies 102, 104 may each be disposed on the same side of the longitudinal axis L.A., and the first heat exchanger assembly 102 may be disposed on one side of the transverse axis T.A. and the second heat exchanger assembly 104 may be disposed on the other side of the transverse axis.

One or more frame members, such as first frame members 120 and second frame members 122 may support the first and second heat exchanger assemblies 102, 104. As an example, the first frame members 120 may support the first vehicle functional component 112 disposed on one side of the longitudinal axis L.A. and the second vehicle functional component 114 disposed on the other side of the longitudinal axis L.A., The second frame members 122 may be configured to carry or support the first heat exchanger 108 and the first cooling fan module 106 and the second heat exchanger 110 and the second cooling fan module 106'. It should be understood that the first and second frame members 120, 122 form one or more portions of the first and second heat exchanger assemblies 102, 104.

The frame members 120, 122 may affect the acoustic performance of the first and second cooling fan modules 106, 106', the first and second heat exchangers 108, 110, the first and second vehicle functional vehicle components 112, 114, or some combination thereof. As an example, sound waves may propagate from one or more of the first and second cooling fan modules 106, 106', the first and second heat exchangers 108, 110, the first and second vehicle functional vehicle components 112, 114, which may lead to objectionable acoustic performance.

Figure 2:
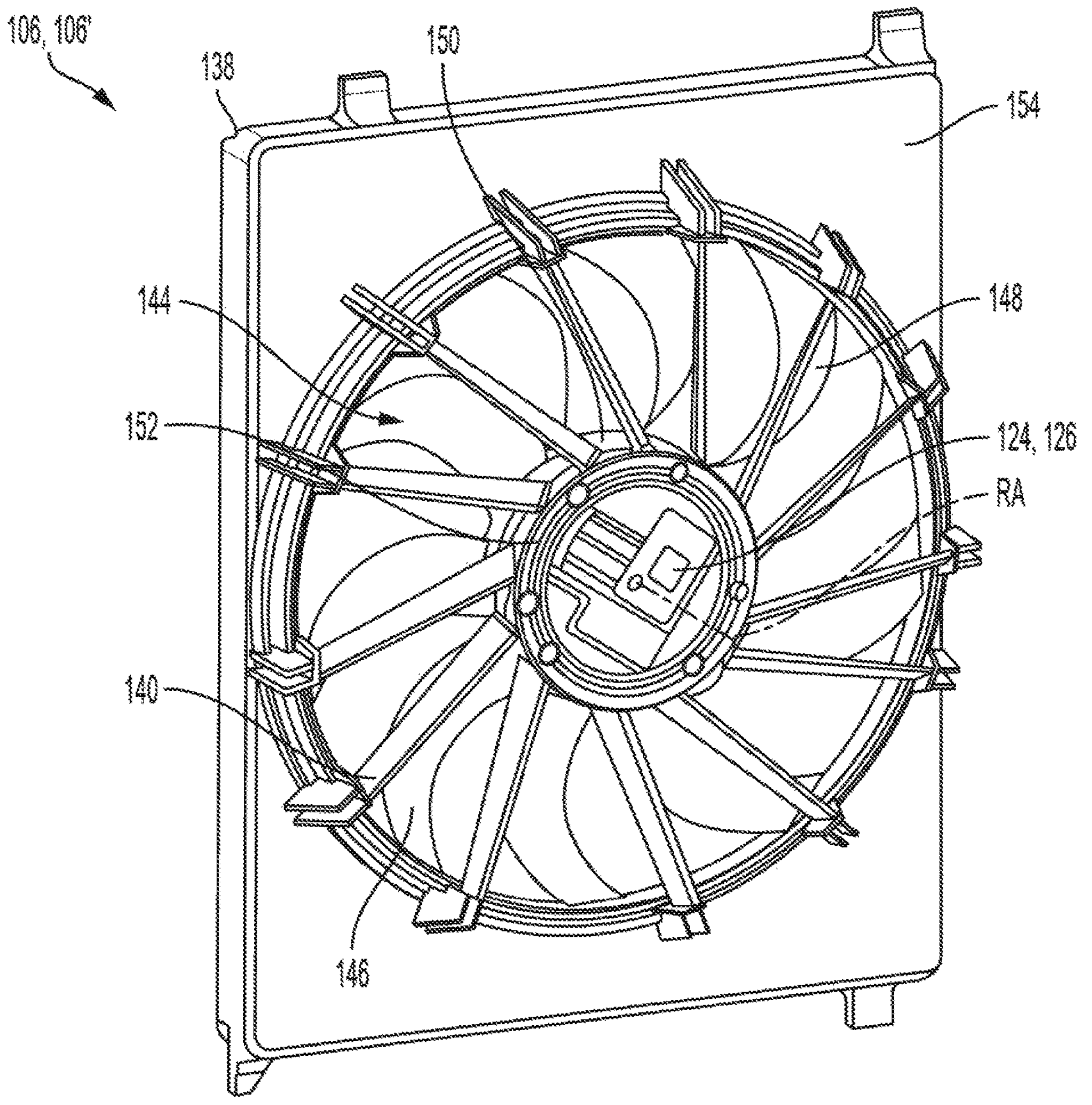
FIG. 2 illustrates a perspective view of an exemplary cooling fan module.

FIG. 2 illustrates a perspective view of the first and second cooling fan module 106, 106'. Because the first and second cooling fan modules are substantially identical, reference numbers 106, 106' are employed. The first and second cooling fan modules 106, 106' may each include a shroud 138 provided with a sidewall 154 and a fan assembly 144. The sidewall 154 may define an opening 148 that may receive the fan assembly 144. The fan assembly 144 may include a motor mounting ring 150 and a motor 152 mounted to the motor mounting ring 150. One or more fan blades 146 extend radially outward from the motor 152. One or more struts 140 may extend form the sidewall 154 to the motor mounting ring 150. In one or more embodiments, one or more of the first and second cooling fan modules such as the first cooling fan module 106 may include a controller, such as a first electronic control unit 124, and the second cooling fan module 106' may include another controller such as a second electronic control unit 126.

Figure 3:
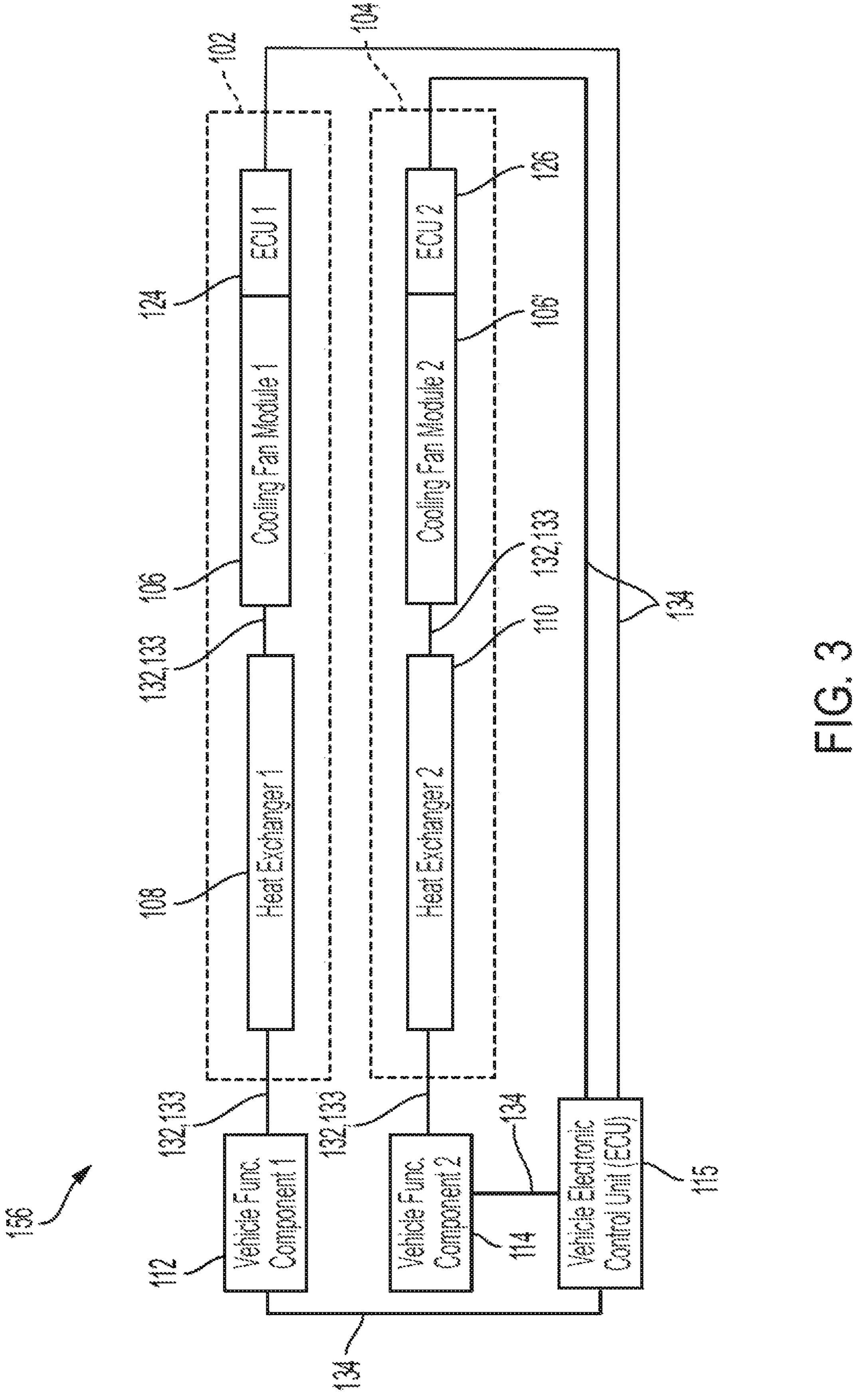
FIGS. 3-6 illustrate exemplary control schematic diagrams according to one or more embodiments.
Figure 4:
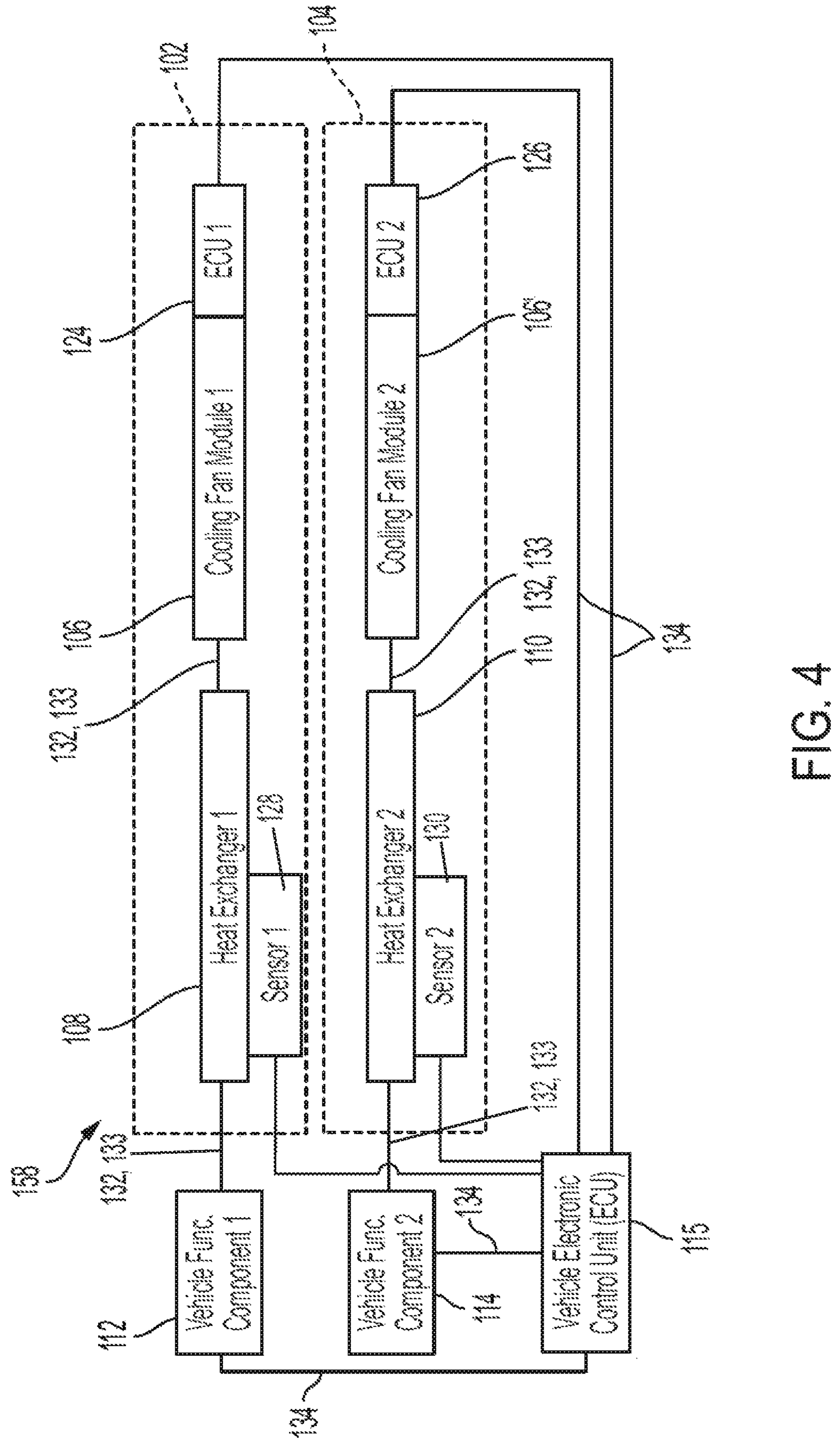
Figure 5:
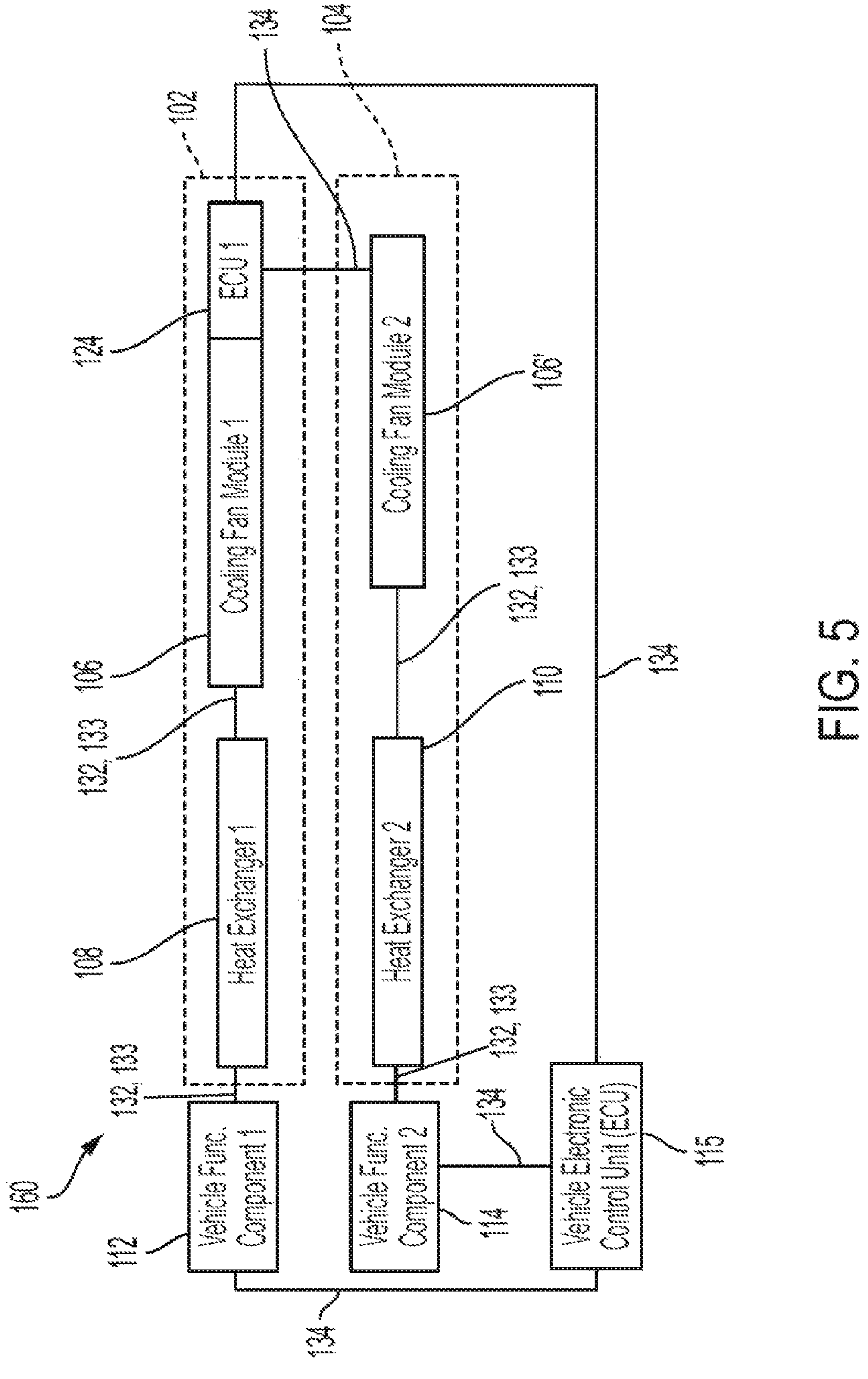
Figure 6:
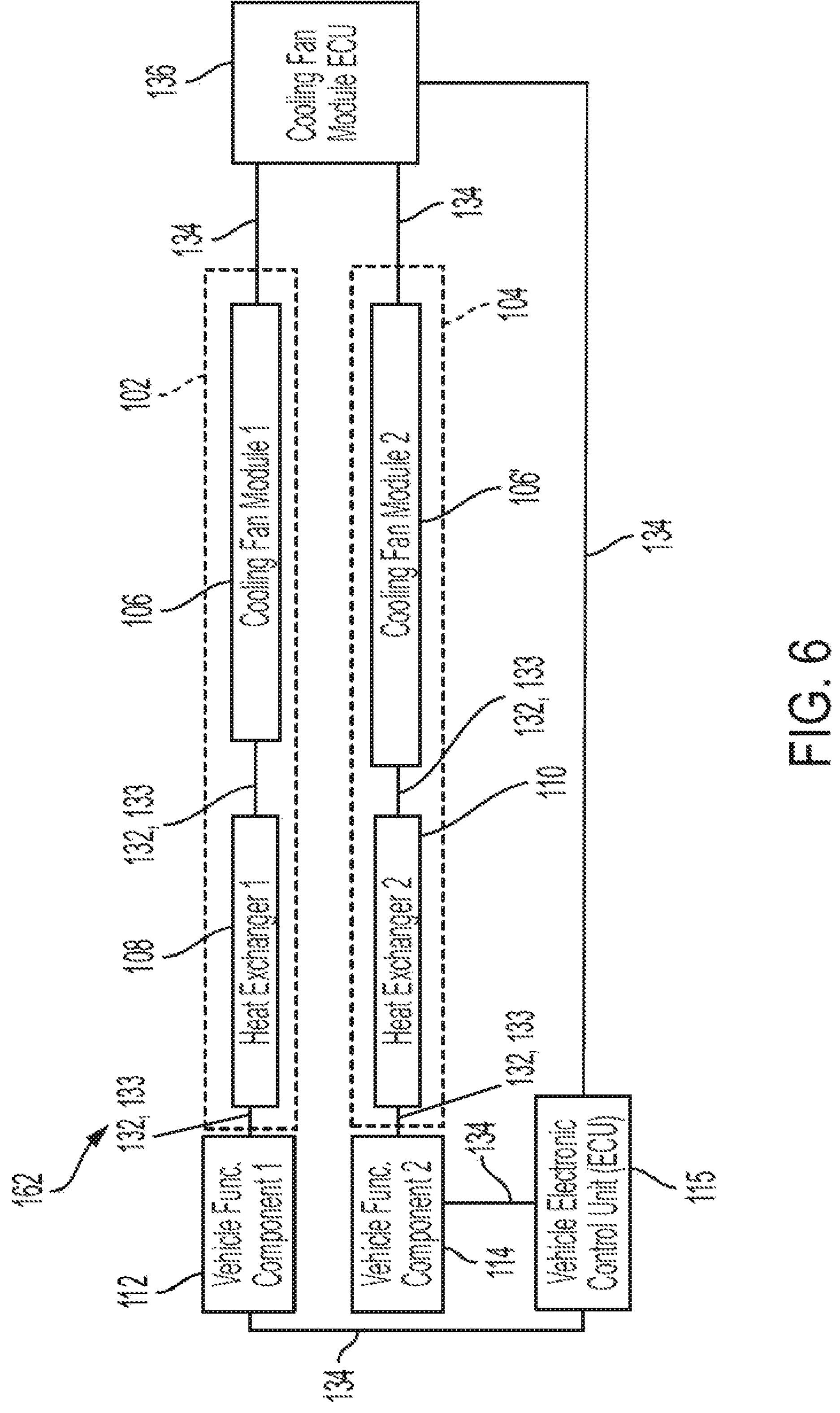

FIG. 3 illustrates an exemplary schematic diagram of a control layout 156 of the heat exchanger system. FIG. 4 illustrates an exemplary schematic diagram of a control layout 158 of the heat exchanger system according another embodiment. FIG. 5 illustrates an exemplary schematic diagram of a control layout 160 of the heat exchanger system according another embodiment. FIG. 6 illustrates an exemplary schematic diagram of a control layout 162 of the heat exchanger system according another embodiment. The first heat exchanger assembly 102 includes the first cooling fan module 106 that may be fluidly coupled to the first heat exchanger 108 by one or more fluid lines 132. The second heat exchanger assembly 104 includes the second cooling fan module 106' that may be fluidly coupled to the second heat exchanger 110 by one or more of the fluid lines 132. The first and second heat exchangers 106, 106' may be electrically connected 134 to the vehicle controller 115 and may be fluidly connected by one or more fluid lines 132 to the first and second functional components 112, 114.

In one or more embodiments, the first cooling fan module 106, the second cooling fan module 106' may be structurally connected to the first heat exchanger 108 and the second heat exchanger 110 by one or more structural interfaces 133, and one or more structural interfaces 133 may structurally connect the first vehicle functional component 112 and the second vehicle functional component 114 to the first heat exchanger 108 and the second heat exchanger 110, respectively. As an example, the one or more structural interfaces 133 may be composed of a number of brackets that may extend between and support the first and second cooling fan modules 106, 106', the first and second heat exchangers 108, 110, and the first and second vehicle functional components 112, 114. The structural interfaces may also include one or more of the frame members 116-122.

Referring specifically to FIG. 3, the first cooling fan module 106 may be operatively connected to the first electronic control unit 124 and the second cooling fan module may be operatively connected to the second electronic control unit 126. In one or more embodiments, the first and second electronic control units 124, 126 may be integrated into the motor 152 of the first and second cooling fan modules 106, 106', respectively. The first electronic control unit 124 and the second electronic control unit 126 may each be electrically connected to the vehicle controller 115 by one or more electrical connections 134. The vehicle controller 115 may be configured to receive or derive demanded heat rejection rates from the first heat exchanger 108, the second heat exchanger 110, or both.

The demanded heat rejection rate may refer to the quantity of heat required to be dissipated so that the first and second vehicle functional components 112, 114, the first and second heat exchangers 108, 110, or some combination thereof operate as intended. The demanded heat rejection rate may be based on measured temperature values of one or more of the first and second heat exchangers 108, 110, the first and second vehicle functional components 112, 114, or some combination thereof. As another example, the demanded heat rejection rate may be forecasted or determined based on the operating parameters of one or more of the first and second vehicle functional components 112, 114, including but not limited to vehicle speed, the amount of required heating or cooling of the vehicle cabin, ambient temperature, and charging status (e.g., actively charging, actively fast charging).

Referring specifically to FIG. 4, one or more sensors may be provided within the first and second heat exchanger assemblies 102, 104. As an example, a first sensor 128 may be fixed to or operatively connected to the first heat exchanger 108 and a second sensor 130 may be fixed to or operatively connected to the second heat exchanger 110. The first and second sensors 128, 130 may be accelerometers configured to measure vibrations generated or transmitted from or through one or more portions of the first and second heat exchanger assemblies 102, 104, such as the first heat exchanger 108, the second heat exchanger 110, the first cooling fan module 106, the second cooling fan module 106', or some combination thereof. In another embodiment, one or more of the first and second sensors 128, 130 may be a microphone configured to measure one or more acoustic properties such as sound pressure, amplitude, loudness and tones.

Referring specifically to FIG. 5, one of the first and second cooling fan modules 106, 106' may include a dedicated controller that is operatively connected to the vehicle controller 115 and the cooling fan module that does not include a dedicated controller. As an example, the first cooling fan module 106 may be provided with the first electronic control unit 124 and the first electronic control unit 124 may be configured to control the first cooling fan module 106 and communicate 134 to control the second cooling fan module 106'. Referring specifically to FIG. 6, the first cooling fan module 106 and the second cooling fan module 106' may be connected to and configured to communicate 134 with a central cooling fan module electronic control unit 136. As an example, the central cooling fan module electronic control unit 136 may be integrated into either the first cooling fan module 106, the second cooling fan module 106', or integrated into the vehicle electronic control unit 115. As another example, the central cooling fan module electronic control unit 136 may be a standalone control unit separate from the first heat exchanger assembly 102 and the second heat exchanger assembly 104. The configurations illustrated FIG. 5 and FIG. 6 may provide one or more advantages, such as reduced cost due to only using one cooling fan module controller.

Figure 7:
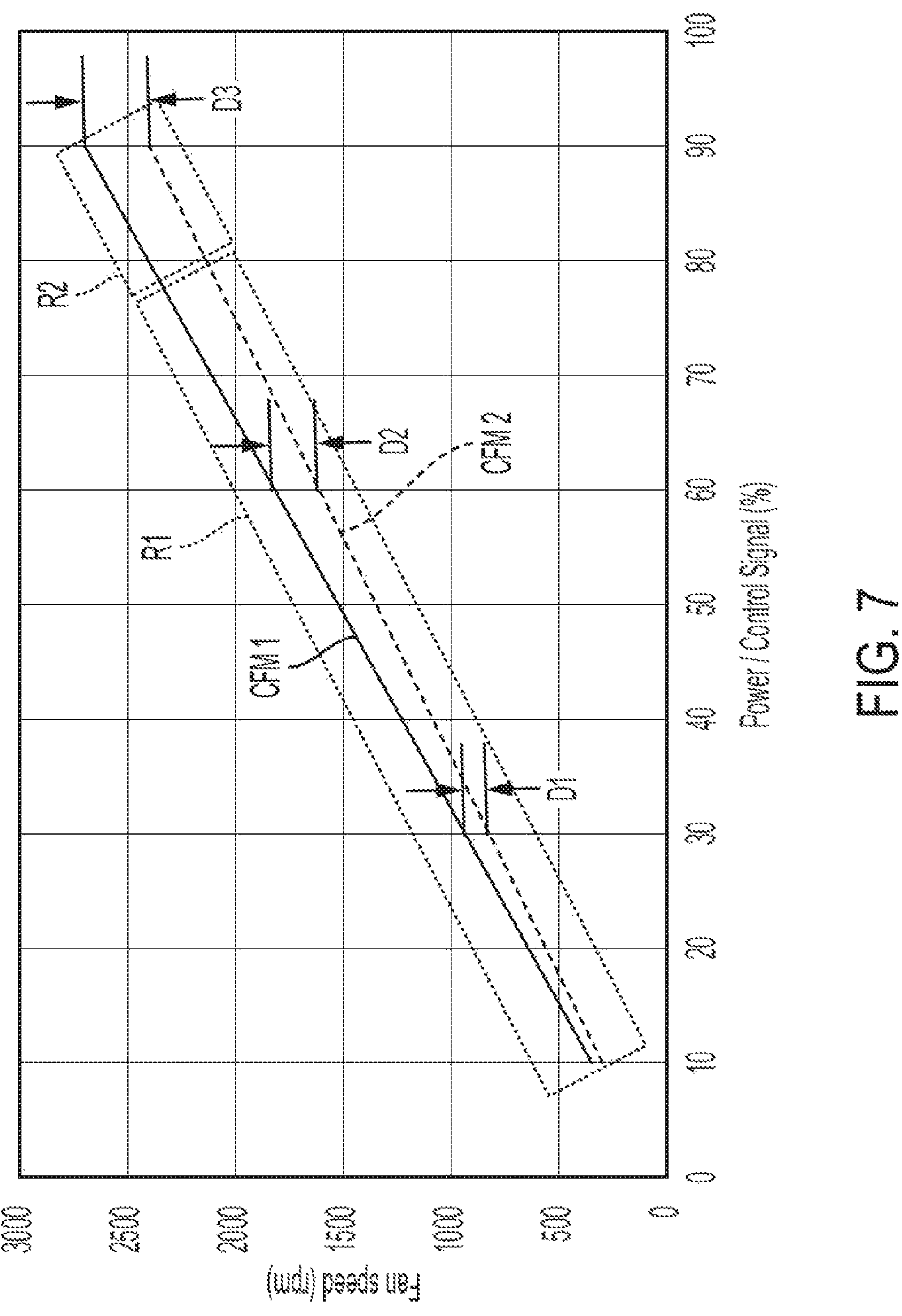
FIG. 7 illustrates a graph depicting fan speed with respect to a power signal.

FIG. 7 illustrates a graph depicting fan speed of the first and second cooling fan modules 106, 106' with respect to the amount of power or electricity provided to the motors 142 of the first and second cooling fan modules 106, 106'. One or more of the controllers 115 or electronic control units 124, 126, 136 may provide an electric power signal to the first and second cooling fan modules 106, 106' to vary the fan speed and, in turn, the flow rate produced by the first and second cooling fan modules 106. The electric power signal may be a pulse width modulation (PWM), a current (e.g., current current), or a local interconnect network (LIN) command.

The solid line CFM 1 represents the fan speed of the first cooling fan module 106, which extends from a minimum speed at approximately 480 rpm and 10% power to a maximum speed of approximately 2,600 rpm and 90% power. The dashed line represents the fan speed of the second cooling fan module 106', which extends from a minimum speed of approximately 470 rpm and 10% power to approximately 2,400 rpm at 90% power. In one or more embodiments, lines CFM 1, CFM 2 may represent the median or average speed with respect to percentage power of the first cooling fan module 106 and the second cooling fan module 106', and the actual speed may fluctuate by a predetermined percentage.

Operating two machines or noise sources (e.g., the first and second cooling fan modules 106, 106') simultaneously may lead to non-conforming acoustic performance. In order to provide suitable acoustic performance, it may be desirable to maintain a speed differential between the first cooling fan module 106 and the second cooling fan module 106'. Maintaining a speed differential or an offset between the speed of the first cooling fan module 106 and the speed of the second cooling fan module 106' may mitigate or prevent certain objectionable acoustic properties.

As the fan speed increases, possibly due to an increase in demanded heat rejection rates, the offset or differential may increase. Because of the relative increase in speed, the overall noise or sound pressure may increase, and as such, the offset or differential may increase to mitigate certain objectionable acoustic properties. As an example, at a 30% power signal, the fan speed of CFM 1 may be approximately 950 rpm and the fan speed of CFM 2 may be approximately 850 rpm, and the first offset or differential D1 may be approximately 100 rpm. As the power signal increases to 60%, the fan speed of CFM 1 may be approximately 1,800 rpm, the fan speed of CFM 2 may be approximately 1,650, and the second offset or differential D2 may be approximately 150 rpm. As the power signal increases to 90%, the fan speed of CFM 1 may be approximately 2,750 rpm, the fan speed of CFM 2 may be approximately 1,900, and the third offset or differential D3 may be approximately 300 to 400 rpm. The first, second, and third differentials D1-D3 may be defined based on optimum acoustic performance while meeting the required thermal management requirements (e.g., demanded heat rejection rates) of the first and second vehicle functional components 112, 114.

One or more of the controllers 115 or electronic control units 124, 126, 136 may be configured to increase the offset or differential between the fan speeds of CFM 1 and CFM 2. As an example, a first region R1 may extend from the 10% power signal to approximately the 80% power signal and a second region R2 may extend from approximately the 80% power signal to approximately the 90% power signal. The offset or differential may increase between the first region R1 and the second region R2. While only two regions are depicted, it should be appreciated that one or more regions may be provided as required. It should be appreciated that the offset or differential may be referred to as a factor.

Ideally, the first and second cooling fan modules 106, 106' are each able to meet the demanded heat rejection rates of the first heat exchanger 108 and the second heat exchanger 110 while maintaining a speed differential between CFM 1 and CFM 2. Under certain circumstances, such as when relatively higher demanded heat rejection rates are required, the speeds of CFM 1 and CFM 2 may be alternated so that CFM 1 rotates at a higher speed (as compared to the speed of CFM 2) for a predetermined period of time, and subsequently, CFM 2 rotates at a higher speed (as compared to the speed of CFM 1) for a predetermined period of time.

Figure 8:
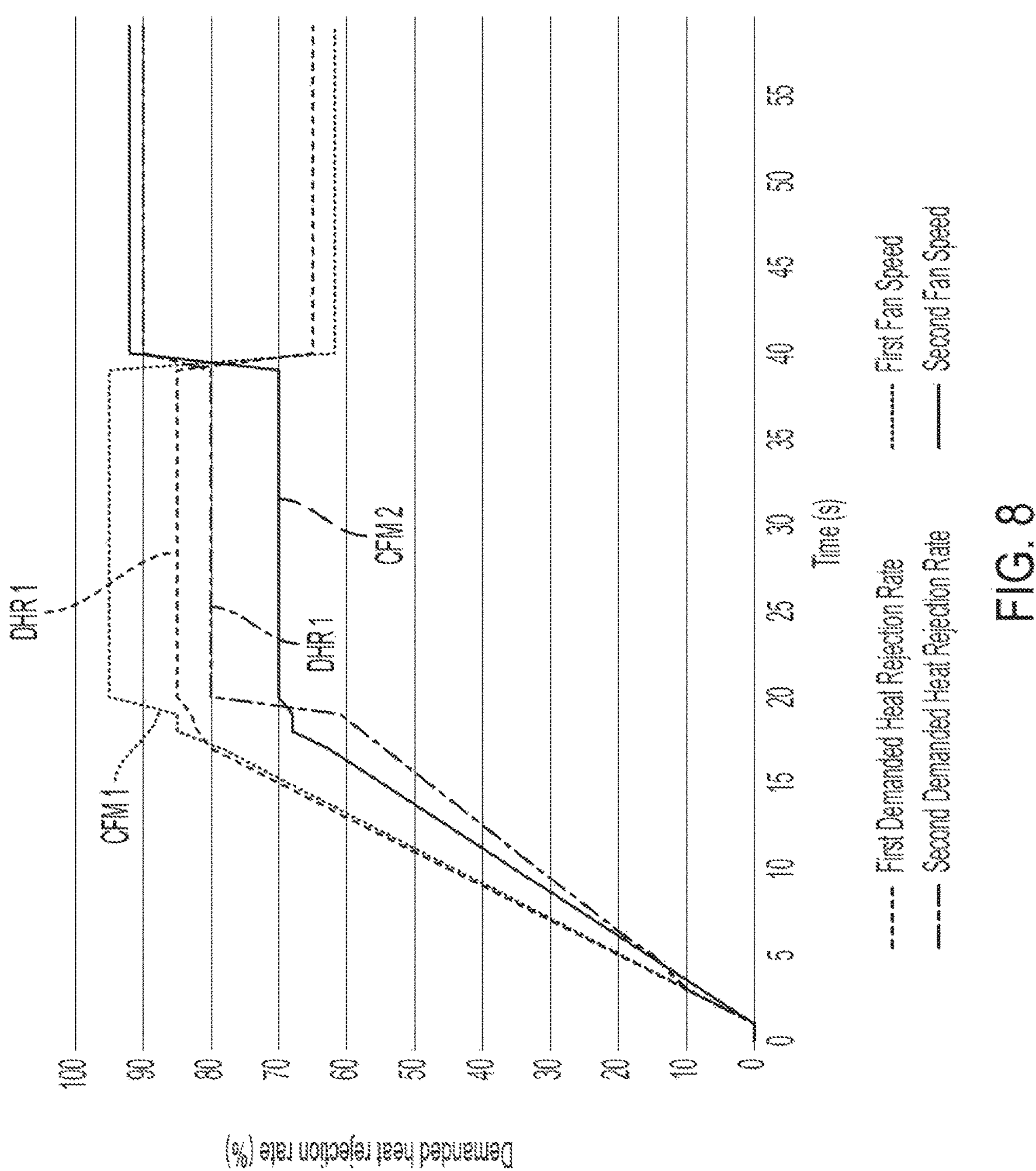
FIG. 8 illustrates a graph depicting fan speed and demanded heat rejection rates with respect to time.

FIG. 8 illustrates a graph depicting fan speed, as a percentage, of the first and second cooling fan and demanded heat rejection rates as a percentage with respect to time (seconds). The fan speed of the first cooling fan module 106 is represented by line CFM 1 and the fan speed of the second cooling fan module 106' is represented by line CFM 2. The first demanded heat rejection rate is represented by line DHR 1 and the second demanded heat rejection rate is represented by DHR 2. One or more of the controllers 115 or electronic control units 124, 126, 136 may be configured to over cool the first heat exchanger 108 or the second heat exchanger 110 in order to decrease the demanded heat rejection rate so that the other heat exchanger may be cooled while maintaining the offset or speed differential. As an example, the fan speed CFM 1 may be increased to approximately 95% in response to the first demanded heat rejection rate DHR 1 being at approximately 85%. Such an increase may allow the fan speed CFM 2 to be subsequently increased in response the second demanded heat rejection rate DHR 2 being increased.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

| | |
|---|---|
| Vehicle | 100 |
| first heat exchanger assembly | 102 |
| second heat exchanger assembly | 104 |
| first cooling fan module | 106 |
| second cooling fan module | 106' |
| first heat exchanger | 108 |
| second heat exchanger | 110 |
| first vehicle functional component | 112 |
| second vehicle functional component | 114 |
| vehicle controller | 115 |
| side rails | 116 |
| frame cross member | 118 |
| first frame members | 120 |
| second frame members | 122 |
| CFM ECU 1 | 124 |
| CFM ECU 2 | 126 |
| first sensor | 128 |
| second sensor | 130 |
| fluid line | 132 |
| structural interfaces | 133 |
| communication line, sensor wiring, electrical wiring | 134 |
| common ECU | 136 |
| shroud | 138 |
| strut | 140 |
| motor | 142 |
| fan assembly | 144 |
| fan blade | 146 |
| opening | 148 |
| motor mounting ring | 150 |
| motor | 152 |
| sidewall | 154 |
| control layout | 156 |
| control layout | 158 |
| control layout | 160 |
| control layout | 162 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A heat exchanger system for use in a vehicle, the heat exchanger system comprising:

a first heat exchanger configured to cool a first functional component of the vehicle;

a second heat exchanger configured to cool a second functional component of the vehicle;

a first cooling fan module provided with a first fan and a first motor configured to drive the first fan to cool the first heat exchanger, the first cooling fan module and the first heat exchanger collectively forming a first heat exchanger assembly;

a second cooling fan module provided with a second fan and a second motor configured to drive the second fan to cool the second heat exchanger, the second cooling fan module and the second heat exchanger collectively forming a second heat exchanger assembly; and at least one controller configured to, responsive to receiving a first demanded heat rejection rate associated with the first heat exchanger and a second demanded heat rejection rate associated with the second heat exchanger, command the first cooling fan module to provide a first air flow rate, and based on the first air flow rate, command the second cooling fan module to provide a second air flow rate that is offset from the first air flow rate such that one or more acoustic properties of at least one of the first heat exchanger assembly and the second heat exchanger assembly is below a predetermined acoustic property threshold.

2. The heat exchanger system of claim 1, wherein the first cooling fan module and the second cooling fan module are substantially identical.

3. The heat exchanger system of claim 1, wherein the one or more acoustic properties includes tone amplitude, loudness, and sound pressure.

4. The heat exchanger system of claim 1, wherein the first demanded heat rejection rate and the second demanded heat rejection rate are each configured to vary with respect to time, wherein the controller is further configured to reduce the first flow rate by a first factor and increase the second flow rate by a second factor, wherein the first factor is substantially identical to the second factor.

5. The heat exchanger of claim 1, wherein the at least one controller is a vehicle controller or integrated into at least one of the first cooling fan module and the second cooling fan module, and wherein the at least one controller is further configured to:

command the first cooling fan module and the second cooling fan module to maintain a predetermined flow rate differential between the first flow rate and the second flow rate.

6. The heat exchanger of claim 5, wherein the predetermined flow rate differential increases based on a quantity of power provided to the first cooling fan module.

7. The heat exchanger of claim 1, wherein the controller is further configured to provide the second flow rate that is offset from the first flow rate by an offset value, wherein the offset value is at least partially based on a natural frequency of at least one of the first heat exchanger assembly and the second heat exchanger assembly.

8. The heat exchanger of claim 7, wherein the vehicle includes one or more frame members and the first heat exchanger assembly includes a first frame member of the one or more frame members, the first frame member configured to carry at least one of the first cooling fan module and the first heat exchanger, wherein the second heat exchanger assembly includes a second frame member of the one or more frame members, the second frame member configured to carry at least one of the second cooling fan module and the second heat exchanger.

9. A heat exchanger system for use in a vehicle, the heat exchanger system comprising:

a first heat exchanger configured to cool a first functional component of the vehicle;

a second heat exchanger configured to cool a second functional component of the vehicle;

a first cooling fan module provided with a first fan and a first motor configured to drive the first fan to cool the first heat exchanger, the first cooling fan module and the first heat exchanger collectively forming a first heat exchanger assembly;

a second cooling fan module disposed adjacent to the first cooling fan module and provided a second fan and a second motor configured to drive the second fan to cool the second heat exchanger, the second cooling fan module and the second heat exchanger collectively forming a second heat exchanger assembly; and at least one controller configured to, responsive to receiving a first demanded heat rejection rate associated with the first heat exchanger and a second demanded heat rejection rate associated with the second heat exchanger, direct a first power signal to the first cooling fan module to operate the first motor at a first rotational speed to provide a first flow rate to satisfy the first demanded heat rejection rate, direct a second power signal to the second cooling fan module to operate the second motor at a second rotational speed to provide a second flow rate to satisfy the second demanded heat rejection rate while maintaining a rotational speed differential between the first rotational speed and the second rotational speed, such that an acoustic property of at least one of the first heat exchanger assembly and the second heat exchanger assembly is below a predetermined acoustic property threshold.

10. The heat exchanger system of claim 9, wherein the at least one controller is further configured to overcool the first heat exchanger and in response thereto, reduce the first power signal and increase the second power signal while maintaining the rotational speed differential between the first rotational speed and the second rotational speed.

11. The heat exchanger system of claim 9, further comprising:

at least one sensor operatively connected to the at least one of the first heat exchanger assembly and the second heat exchanger assembly, the at least one sensor configured to measure one or more physical properties indicative of the one or more acoustic properties of at least one of the first heat exchanger assembly and the second heat exchanger assembly.

12. The heat exchanger system of claim 11, wherein the at least one sensor is an accelerometer configured to measure vibrations of the at least one of the first heat exchanger assembly and the second heat exchanger assembly, wherein the vibrations measured by the accelerometer are indicative of the one or more acoustic properties of at least one of the first heat exchanger assembly and the second heat exchanger assembly.

13. The heat exchanger system of claim 9, wherein the at least one controller includes a first heat exchanger assembly controller configured to direct at least one of the first power signal to the first cooling fan module and the second power signal to the second cooling fan module.

14. The heat exchanger of claim 13, wherein the first heat exchanger assembly controller is configured to communicate with a vehicle controller, wherein the first heat exchanger assembly controller is configured to receive at least one of the first demanded heat rejection rate and the second demanded heat rejection rate from the vehicle controller.

15. The heat exchanger of claim 9, wherein the vehicle includes a first functional component and a second functional component, wherein the vehicle defines a longitudinal axis and a transverse axis, the longitudinal axis disposed substantially in a center of the vehicle and extending between a rear end and a front end of the vehicle, the transverse axis disposed substantially in the center of the vehicle and extending in a direction substantially orthogonal to the longitudinal axis, wherein the first heat exchanger assembly is configured to cool the first functional component and the second heat exchanger assembly is configured to cool the second functional component, and wherein the first functional component is disposed on one side of at least one of the longitudinal axis and the transverse axis, and the second functional component is disposed on another side of the at least one of the longitudinal axis and the transverse axis.

16. The heat exchanger of claim 15, wherein the first functional component includes at least one of a traction battery, an electric drive motor, and an inverter.

17. A method of operating a heat exchanger system for use in a motor vehicle, the method comprising:

receiving, by a controller, a first demanded heat rejection rate associated with a first heat exchanger;

receiving, by the controller, a second demanded heat rejection rate associated with a second heat exchanger;

directing, by the controller, a first power signal to a first cooling fan module, disposed adjacent to the first heat exchanger, to operate a first motor of the first cooling fan module at a first operational speed to provide a first flow rate to satisfy the first demanded heat rejection rate;

directing, by the controller, a second power signal to a second cooling fan module disposed adjacent to the second heat exchanger to operate a second motor of the second cooling fan module at a second rotational speed to provide a second flow rate; and maintaining, by the controller, a rotational speed differential between the first rotational speed and the second rotational speed, such that an acoustic property of the heat exchanger system is below a predetermined acoustic property threshold.

18. The method of claim 17, wherein the second flow rate does not satisfy the second demanded heat rejection rate for a first period of time.

19. The method of claim 18, wherein the directing the first power signal step includes overcooling the first heat exchanger for the first period of time.

20. The method of claim 17, further comprising:

altering the second power signal to increase the second rotational speed of the second motor to satisfy the second demanded heat rejection rate.

* * * * *